United States Patent
Kommula et al.

(10) Patent No.: US 11,323,326 B2
(45) Date of Patent: May 3, 2022

(54) PRE-VALIDATION OF NETWORK CONFIGURATION

(71) Applicant: VMware, Inc., Palo Alto, CA (US)

(72) Inventors: Raja Kommula, Cupertino, CA (US); Thayumanavan Sridhar, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/745,282

(22) Filed: Jan. 16, 2020

(65) Prior Publication Data
US 2021/0226848 A1 Jul. 22, 2021

(51) Int. Cl.
| | |
|---|---|
| H04L 12/24 | (2006.01) |
| H04L 12/931 | (2013.01) |
| H04L 41/0869 | (2022.01) |
| H04L 49/40 | (2022.01) |
| H04L 41/0806 | (2022.01) |

(52) U.S. Cl.
CPC ...... *H04L 41/0869* (2013.01); *H04L 41/0806* (2013.01); *H04L 49/40* (2013.01)

(58) Field of Classification Search
CPC .. H04L 41/0869; H04L 41/0806; H04L 49/40
See application file for complete search history.

(56) References Cited

U.S. PATENT DOCUMENTS

| | | | | |
|---|---|---|---|---|
| 2012/0253728 | A1* | 10/2012 | Chamas | G06F 11/2294 702/109 |
| 2014/0169187 | A1* | 6/2014 | Jenkins | H04L 41/145 370/252 |
| 2015/0356215 | A1* | 12/2015 | Cady | H04L 41/12 703/21 |
| 2017/0034023 | A1* | 2/2017 | Nickolov | H04L 43/0817 |
| 2017/0054601 | A1* | 2/2017 | Affoneh | H04L 41/0869 |
| 2018/0295045 | A1* | 10/2018 | Bali | H04L 67/2814 |
| 2019/0173764 | A1* | 6/2019 | Di Martino | H04L 41/145 |
| 2019/0207818 | A1* | 7/2019 | Niestemski | H04L 41/065 |
| 2019/0215246 | A1 | 7/2019 | Kawalay et al. | |
| 2019/0245755 | A1* | 8/2019 | Cooper | H04L 45/14 |
| 2020/0067788 | A1* | 2/2020 | Thakkar | H04L 43/0876 |
| 2020/0349041 | A1* | 11/2020 | Roll | G06F 11/261 |

OTHER PUBLICATIONS

Bernard Marr, "What Is Digital Twin Technology—And Why Is It so Important?", Article from Forbes, Mar. 6, 2017.

* cited by examiner

*Primary Examiner* — Minh Chau Nguyen
*Assistant Examiner* — Jihad K Boustany
(74) *Attorney, Agent, or Firm* — Su IP Consulting

(57) ABSTRACT

Example methods and systems for pre-validation of network configuration are disclosed. One example may comprise: detecting a request for network configuration to be implemented in a physical network environment; and identifying a set of physical network elements associated with the network configuration. The method may further comprise emulating the set of physical network elements to determine a physical network behaviour caused by the network configuration; and assessing validity of the network configuration based on the physical network behaviour. The set of physical network elements may be emulated using (a) multiple first physical network element emulators and (b) a second physical network element emulator that aggregates the multiple first physical network element emulators.

18 Claims, 8 Drawing Sheets

PRE-VALIDATION OF NETWORK CONFIGURATION

BACKGROUND

Virtualization allows the abstraction and pooling of hardware resources to support virtualization computing instance such as virtual machines (VMs) in a software-defined data center (SDDC). For example, through compute virtualization (also known as hardware virtualization), VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, the design of SDDC may involve both physical and virtual network configuration. For example, during network configuration, a network administrator may define a physical network topology for connecting physical switches and hosts. A robust configuration of the underlying physical network is desirable to facilitate traffic forwarding among VMs and hosts in the SDDC.

DETAILED DESCRIPTION

Figure 1:
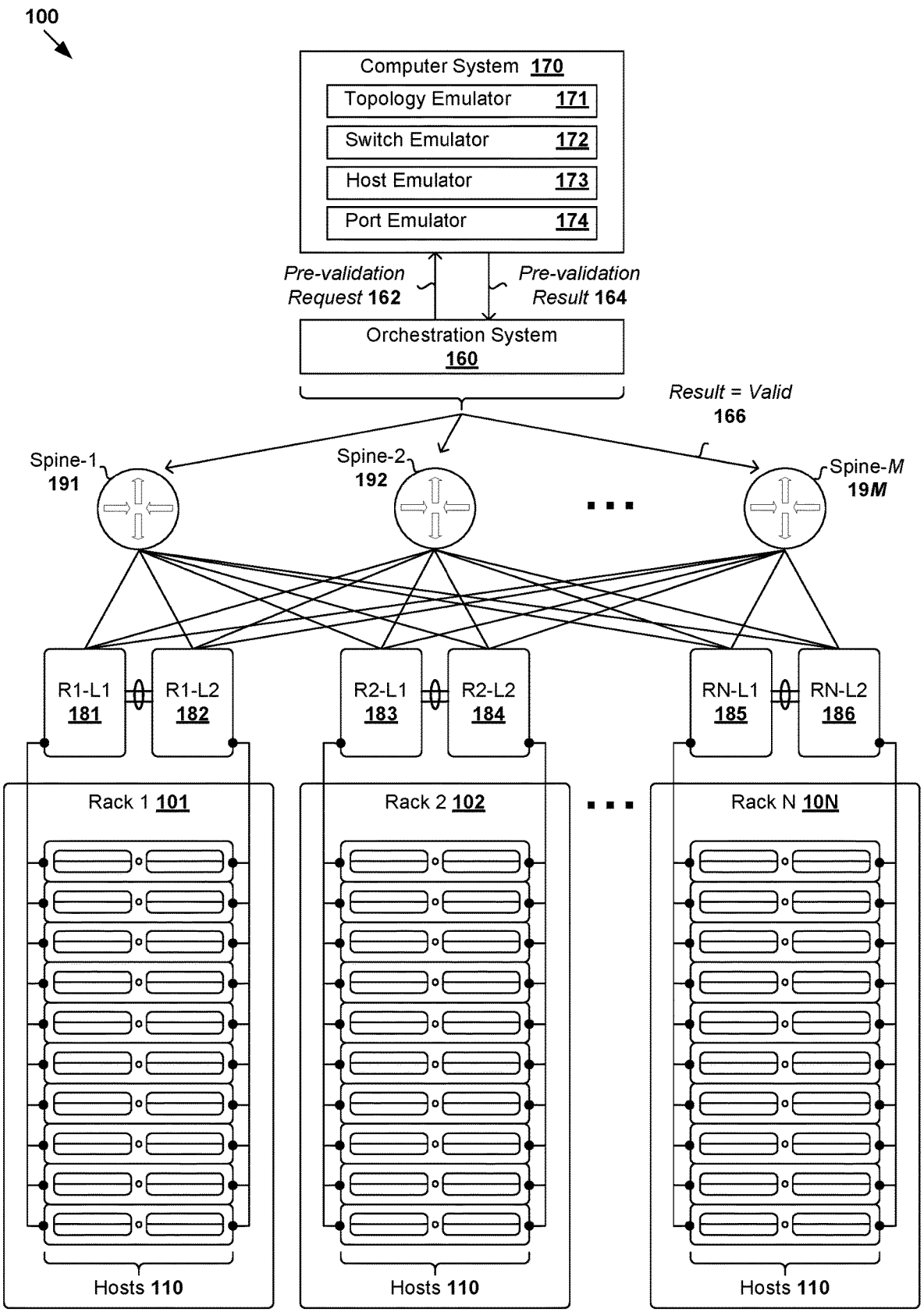
FIG. 1 is a schematic diagram illustrating an example physical network environment in which pre-validation of network configuration may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

Challenges relating to network configuration will now be explained in more detail using FIG. 1, which is a schematic diagram illustrating example network environment 100 in which pre-validation of network configuration may be performed. It should be understood that, depending on the desired implementation, physical network environment 100 may include additional and/or alternative components than that shown in FIG. 1.

In the example in FIG. 1, physical network environment 100 is designed with a leaf-and-spine architecture having a leaf layer with multiple leaf switches 181-186 and a spine layer with multiple (M) spine switches 191-19M. A leaf switch is also referred to as a top-of-rack (ToR) switch because it provides network access to hosts 110 located at a particular rack. A spine switch in the spine layer extends the physical network fabric of ToR switches 181-186 to provide connectivity among racks 101-10N. Using a full-mesh topology, each of leaf switches 181-186 is connected to each of spine switches 191-19M. This way, all east-west traffic from one rack to another is equidistant with a deterministic number of hops. All ports on a spine switch may connect to leaf switches 181-186 using layer-2 switching and/or layer-3 routing technologies.

Using N to denote the number of racks, any suitable number of leaf switches may be located at the top of each compute rack. For example, a first pair of leaf switches 181-182 (see "R1-L1" and "R1-L2") may provide network access to hosts 110 on first rack 101, a second pair of leaf switches 183-184 (see "R2-L1" and "R2-Lf2") for second rack 102, and so on. The N$^{th}$ pair of leaf switches 185-186 (see "RN-L1" and "RN-L2") provides network access for N$^{th}$ rack 10N. For redundancy, each host 110 on a particular rack is connected to multiple leaf switches at the top of the rack. For example, on first rack 101, a first physical network interface controller (PNIC) of host 110 is connected to one leaf switch 181 and a second PNIC to another leaf switch 182.

In practice, physical network environment 100 may include any number of hosts (also known as a "host computers", "host devices", "physical servers", "server systems", "transport nodes," etc.), where each host may be supporting tens or hundreds of virtual machines (VMs). Hosts 110 will be explained further using FIG. 2, which is a schematic diagram illustrating example physical implementation view 200 of hosts 110 in physical network environment 100 in FIG. 1. It should be understood that example 200 may include additional and/or alternative components than that shown in FIG. 2. In the example in FIG. 2, several hosts 110 are shown in detail, such as host-A 110A, host-B 110B and host-C 110C. Note that hosts 110A-C may be located on the same physical rack, or different racks in FIG. 1.

Hosts 110A-C are inter-connected via physical network 201 supported by leaf switches 181-186 and spine switches 191-19M. Each host 110A/110B/110C may include suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM4 134; host-B 110B supports VMs 132-133; and host-C 110C supports VMs 135-136. Hypervisor 114A/114B/114C maintains a mapping between underlying hardware 112A/112B/112C and virtual resources allocated to respective VMs 131-136. The virtual resources may be used by each VM to support a guest operating system (OS) and application(s).

Although examples of the present disclosure refer to VMs, it should be understood that a "virtual machine"

running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-4" to a network or Internet Protocol (IP) layer; and "layer-4" to a transport layer (e.g., using Transmission Control Protocol (TCP) and User Datagram Protocol (UDP), etc.), in the Open System Interconnection (OSI) model, although the concepts described herein may be used with other networking models.

Through compute virtualization, virtual resources may be allocated each VM, such as virtual guest physical memory, virtual disk, virtual network interface controller (VNIC), etc. In the example in FIG. 2, hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc. Hardware resources may be emulated using virtual machine monitors (VMMs). For example, VNICs 141-146 are emulated by corresponding VMMs (not shown for simplicity). The VMMs may be considered as part of respective VMs 131-136, or alternatively, separated from VMs 131-136. Although one-to-one relationships are shown, one VM may be associated with multiple VNICs (each VNIC having its own network address).

Through network virtualization, logical overlay networks may be provisioned, changed, stored, deleted and restored programmatically without having to reconfigure the underlying physical hardware architecture in data center(s). Logical switches and logical routers may be implemented in a distributed manner and can span multiple hosts to connect VMs 131-136 in FIG. 1. For example, hypervisor 114A/114B/114C implements virtual switch 115A/115B/115C and logical distributed router (DR) instance 117A/117B/117C to handle egress packets from, and ingress packets to, corresponding VMs 131-136. Logical switches (e.g., 201-204) may be implemented to provide logical layer-2 connectivity. A particular logical switch may be collectively by multiple virtual switches (e.g., 115A-C) and represented internally using forwarding tables (e.g., 116A-C) at respective virtual switches. Forwarding tables 116A-C may each include entries that collectively implement the respective logical switches. Further, logical DRs may be implemented to provide logical layer-4 connectivity. A particular logical DR may be implemented collectively by multiple DR instances (e.g., 117A-C) and represented internally using routing tables (e.g., 118A-C) at respective DR instances. Routing tables 118A-C may each include entries that collectively implement the respective logical DRs.

Packets may be received from, or sent to, each VM via an associated logical switch port. For example, logical switch ports 151-156 (labelled "LSP1" to "LSP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches, whereas a "virtual switch" may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding VM (e.g., when the source host and destination host do not have a distributed virtual switch spanning them).

Through network virtualization, logical overlay networks may be provisioned, changed, stored, deleted and restored programmatically without having to reconfigure the underlying physical hardware architecture. Here, a logical overlay network (also known as "logical network") may be formed using any suitable tunneling protocol, such as Virtual eXtensible Local Area Network (VXLAN), Generic Network Virtualization Encapsulation (Geneve), etc. For example, VXLAN is a layer-2 overlay scheme on a layer-4 network that uses tunnel encapsulation to extend layer-2 segments across multiple hosts. Hypervisor 114A/114B/114C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A). Hypervisor-B 114B implements a second VTEP with (IP-B, MAC-B), and hypervisor-C 114C a third VTEP with (IP-C, MAC-C). Encapsulated packets may be sent via a tunnel established between a pair of VTEPs over physical network 104, over which respective hosts are in layer-4 connectivity with one another.

SDN manager 210 and SDN controller 220 are example network management entities that facilitate management of various entities in physical network environment 100. An example SDN controller is the NSX controller component of VMware NSX® (available from VMware, Inc.) that resides on a central control plane (CCP), and connected to SDN manager 210 (e.g., NSX manager) on a management plane (MP). See also CCP module 221 and MP module 211. Each host 110A/110B/110C may implement local control plane (LCP) agent 119A/119B/119C to maintain control-plane connectivity with management entities 220, 210. For example, control-plane channels may be established between SDN controller 220 and respective hosts 110A-C using TCP over Secure Sockets Layer (SSL), etc. Management entity 210/220 may be implemented using physical machine(s), virtual machine(s), a combination thereof, etc.

Depending on the desired implementation, some servers in each physical rack may be configured to be part of a management domain.

Conventionally, network administrators may use automated tools to perform network orchestration and other configuration tasks, such as tools provided by orchestration system 160 in FIG. 1. For example, to create a leaf-spine fabric, a network administrator has to connect physical cables among hosts 110 on racks 101-10N, ToR switches 181-186 and spine switches 191-19M to facilitate day-2 operations such as adding or removing hosts 110, etc. Orchestration system 160 is then used to implement network configurations according to the desired implementation. If there are any issues associated with the physical network configuration, the network administrator may attempt to have the configuration reversed. However, not all configuration changes are easily reversible. For example, if connectivity is lost with a switch due to a configuration change, orchestration system 160 is unable to instruct the switch to revert to the previous configuration because the switch has become unreachable. In this case, network and host performance will be affected.

Pre-Validation of Network Configuration

According to examples of the present disclosure, pre-validation of network configuration may be performed to reduce the likelihood of invalid configurations that may affect the performance of data centers. Instead of blindly implementing configuration requests from network administrators, examples of the present disclosure may be implemented to assess the validity of the configuration requests through emulation of various physical network elements in physical network environment 100, such as physical switches (e.g., 181-186, 191-19M), hosts 110, etc.

As used herein, the term "pre-validation" may refer generally to validation operation(s) performed prior to implementing network configuration in the actual physical network environment. Examples of the present disclosure should be contrasted against conventional validation approaches that are performed by orchestration system 160 after implementing a user's request for network configuration. Using these conventional approaches, orchestration system 160 implements the network configuration without checking whether it will cause any undesirable physical network behaviors. When problems materialize due to the network configuration, network performance is already affected. In contrast, examples of the present disclosure may be implemented to emulate physical network elements as a preemptive measure against potential issues.

Figure 3:
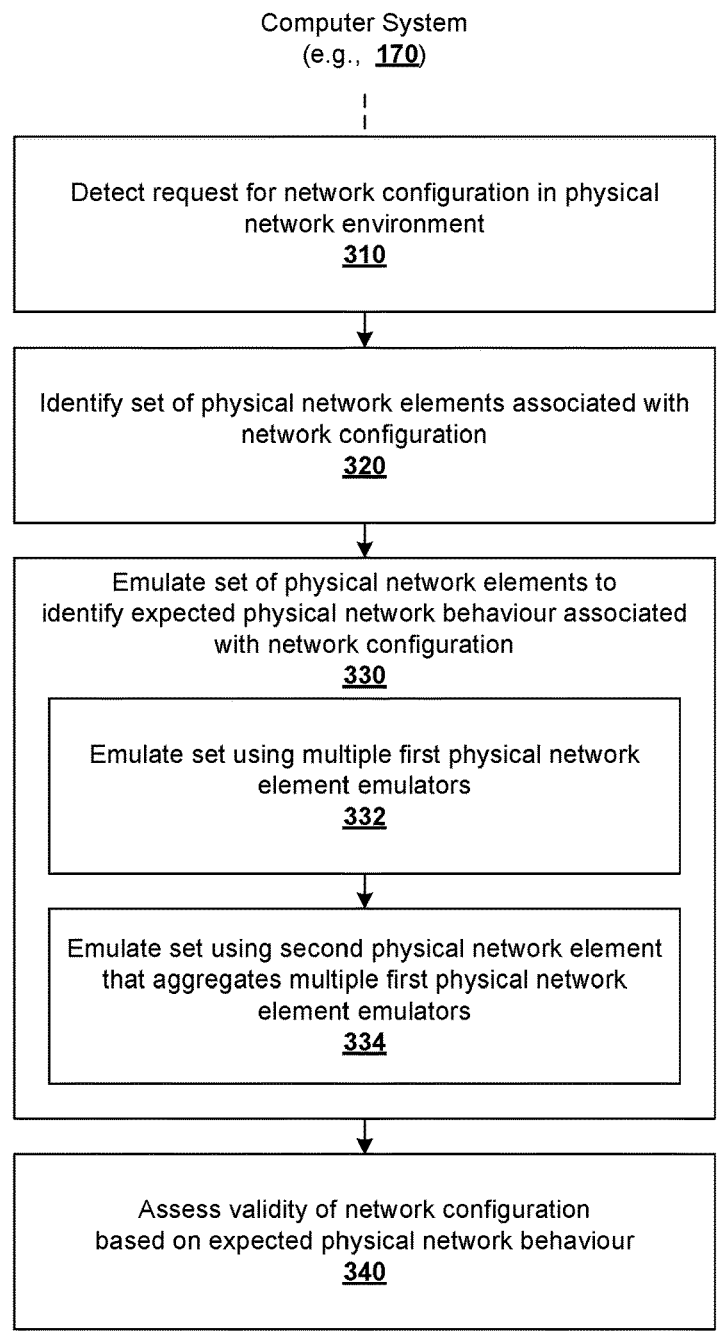
FIG. 3 is a flowchart of an example process for a computer system to perform pre-validation of network configuration.

In more detail, FIG. 3 is a flowchart of example process 300 for a computer system to perform pre-validation of network configuration for physical network environment 100. Example process 300 may include one or more operations, functions, or actions illustrated by one or more blocks, such as 310 to 340. The various blocks may be combined into fewer blocks, divided into additional blocks, and/or eliminated depending on the desired implementation. As will be discussed further using FIG. 3, examples of the present disclosure may be implemented using any suitable computer system 170.

At 310 in FIG. 3, computer system 170 may detect a request (see 162 in FIG. 1) for network configuration to be implemented in physical network environment 100. In practice, the request may be initiated by a user (e.g., network administrator) using any suitable interface supported by orchestration system 160. Any suitable physical network configuration may be requested, such as configuration of ToR switches 181-186, spine switches 191-19M, hosts 110 or any combination thereof.

At 320 and 330 in FIG. 3, computer system 170 may identify and emulate a set of physical network elements associated with the network configuration. The emulation may be performed to identify an expected physical network behavior associated with the physical network configuration. The set of physical network elements may be emulated using at least (a) multiple first physical network element emulators and (b) a second physical network element emulator that includes or aggregates the multiple first physical network element emulators. See corresponding 332 and 334 in FIG. 3.

As used herein, the term "physical network element" may refer generally to a physical entity in physical network environment 100, such as a physical switch (e.g., ToR switch or spine switch), physical switch port, physical host, physical host port, etc. The term "physical network element emulator" may refer generally to hardware and/or software configured to imitate the behavior of a corresponding physical network element. Depending on the desired implementation, a digital composition model having a hierarchical structure may be implemented to facilitate a "what-if" analysis.

As will be discussed further using FIG. 4, computer system 170 may implement topology emulator 171 that includes multiple physical switch emulators 172 and multiple physical host emulators 173. Switch emulator 172 ("second physical network element emulator") may aggregate or encompass multiple switch port emulators ("first physical network element emulators"). Host emulator 173 ("second physical network element emulator") may aggregate or encompass multiple host port emulators ("first physical network element emulators"). See also port emulator 174 for emulating behavior of a physical port on a switch, host or another entity.

At 340 in FIG. 3, computer system 170 may assess validity of the network configuration based on the expected physical network behavior to determine whether to implement the requested network configuration. For example, if assessed to be valid, computer system 170 may generate and send a response to cause orchestration system 160 to implement the requested network configuration (see 164-166 in FIG. 1).

Otherwise, in response to assessment that the requested network configuration is invalid, computer system 170 may generate and send a response to cause orchestration system 160 to disregard the requested network configuration. In this case, computer system 170 may also determine a remediation action to avoid or ameliorate the expected physical network behavior (to be discussed using FIG. 5 to FIG. 8).

Digital Composition Model

According to examples of the present disclosure, computer system 170 may implement a digital composition model to assess the validity of physical network configurations. This way, configuration changes may be simulated and tested before they are implemented in actual physical network environment 100. If operational issues are detected in the digital composition model, computer system 170 may alert orchestration system 160 such that remediation action(s) may be taken.

Figure 4:
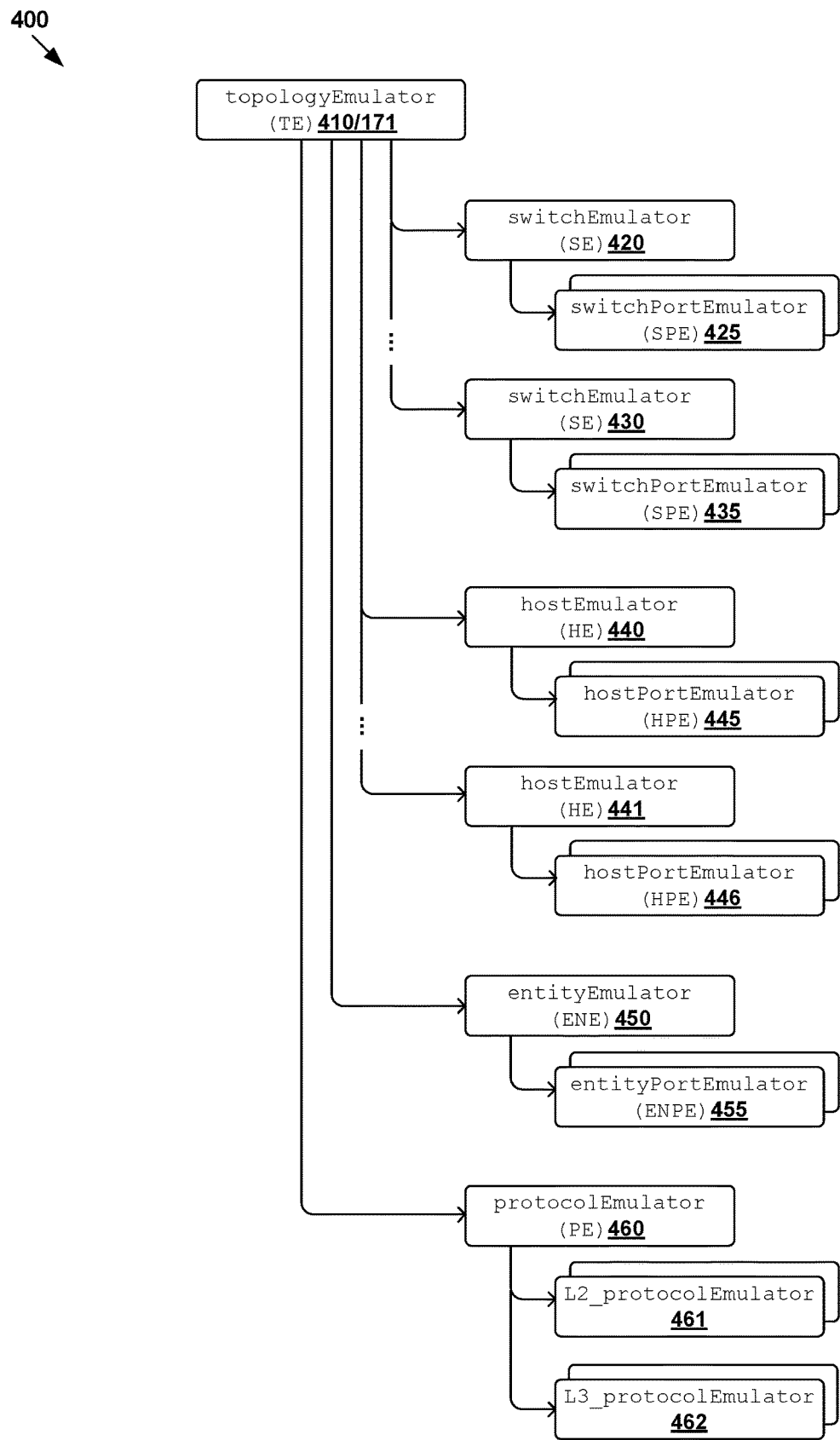
FIG. 4 is a schematic diagram illustrating an example digital composition model of a network environment for pre-validation of network configuration.

FIG. 4 is a schematic diagram illustrating example digital composition model 400 of physical network environment 100 for pre-validation of network configuration. In particular, computer system 170 may implement a hierarchical set of emulators capable of emulating respective physical network elements in physical network environment 100, such as topology emulator 410/171 (labelled "TE"), switch emulator(s) 420/430 ("SE"), switch port emulator(s) 425/435 ("SPE"), host emulator(s) 440/441 ("HE") and host port emulator(s) 445/446 ("HPE"). Besides hosts and switches, any other physical network element may be emulated using entity emulator(s) 450 (labelled "ENE") and associated entity port emulator(s) 455 (labelled "ENPE"). Note that multiple entity 450 and protocol 460 emulators may be used.

At 410 in FIG. 4, a topology emulator (labelled "TE") may be configured to emulate a physical network topology in physical network environment 100. Using a hierarchical topology graph in FIG. 4, topology emulator 410 may be represented using a root node that is connected to, and aggregates, multiple leaf nodes representing respective emulators 420-460. In particular, topology emulator 410 may aggregate or encompass a set of switch emulators 420-430 (labelled "SE"), host emulators 440-441 (labelled "HE") and any other entity emulators 450 (labelled "ENE"), as well as interconnections among them.

At 420-430 in FIG. 4, switch emulators may be configured to emulate respective physical switches in physical network environment 100, such as ToR switches 181-186 and spine switches 191-19M. Each switch emulator 420/430 may aggregate or encompass a set of multiple switch port emulators 425/435, and any interconnections among them. Switch port emulator 425/435 may support multiple modes at the same time, such as layer-2 mode, layer-3 mode, end-system mode, etc. Depending on the desired implementation, switch emulator 420/430 may be configured to emulate an application-specific integrated circuit (ASIC) capable of performing functionalities of a physical switch.

Figure 2:
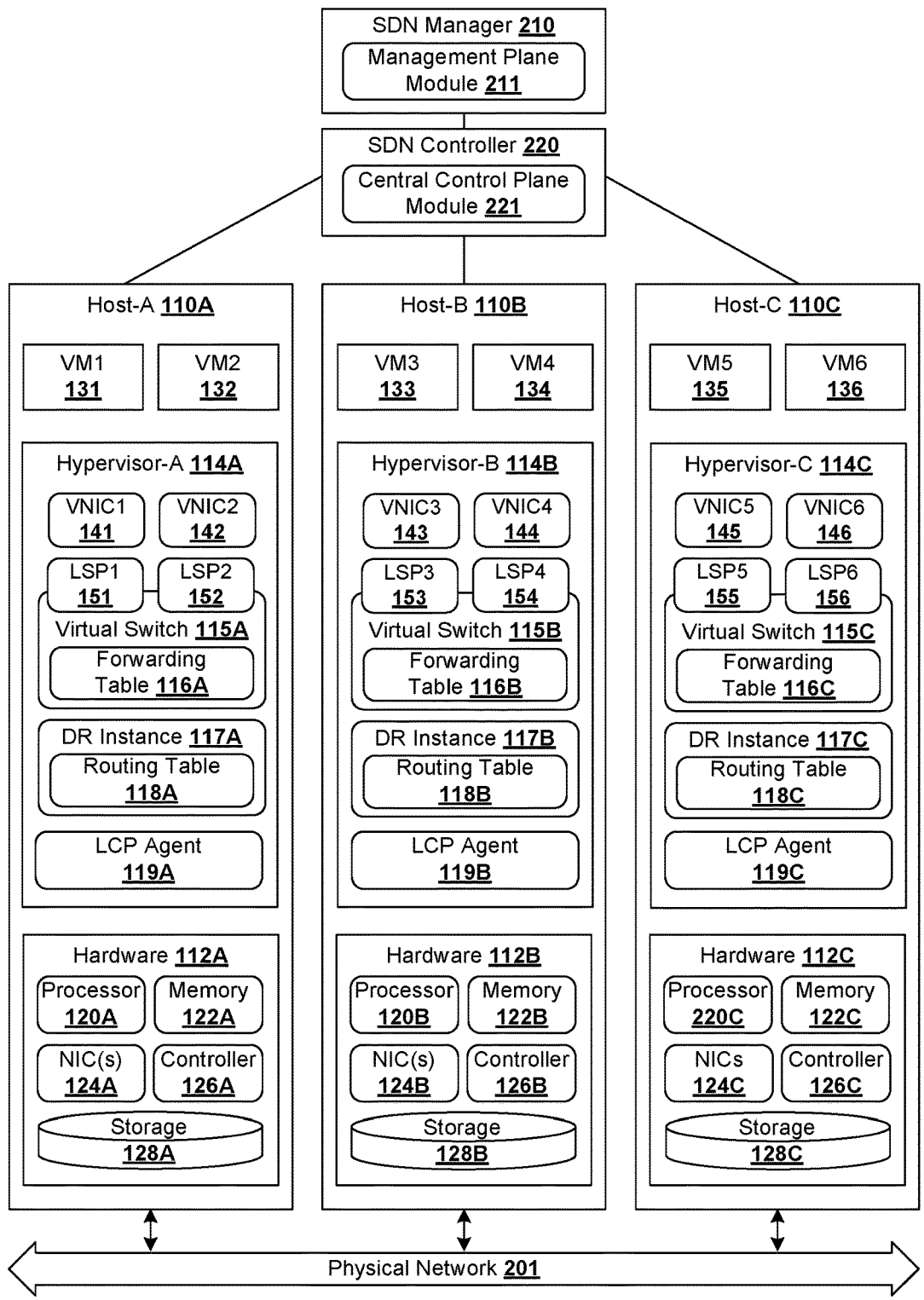
FIG. 2 is a schematic diagram illustrating an example physical implementation view of hosts in the physical network environment in FIG. 1.

At 440-441 in FIG. 4, host emulators may be configured to emulate respective physical hosts 110 in physical network environment 100, such as host-A 110A, host-B 110B and host-C 110C in FIG. 2. Each host emulator 440/441 may aggregate or encompass a set of multiple host port emulators 445/446, and any interconnections among them. Host emulators 440/441 may be used to model network connectivity between hosts 110 and corresponding ToR switches 181-186. In practice, entity emulators 450 may be configured to emulate any other physical and/or virtual network elements, such as edge appliances to facilitate north-south traffic forwarding, software-defined wide area network (SD-WAN) appliances, firewalls, load balancers, management entities, etc.

At 460 in FIG. 4, topology emulator 410 may further include a protocol emulator (labelled "PE") to emulate protocol implementation by ToR switches 181-186, spine switches 191-19M, switch ports, hosts 110, host ports, etc. This is to validate that a specific configuration would work subject to various constraints in the topology and existing connectivity requirements. Depending on the desired implementation, protocol emulator 460 may emulate layer-2 protocol(s) 461, layer-3 protocol(s) 462, security protocol(s) 463, overlay protocol(s), tunneling protocol(s), virtual private network (VPN) protocol(s), any combination thereof, etc.

Example protocols that may be emulated using protocol emulator 460 include spanning tree protocol (STP) for loop detection, link aggregation control protocol (LACP) for link aggregation, and border gateway protocol (BGP) for routing information exchange. For routing, protocol emulator 460 may emulate the implementation of open shortest path first (OSPF), equal-cost multipath protocol (ECMP), intermediate system to intermediate system (IS-IS) and transparent interconnect of lots of links (TRILL) for multipath routing, any combination thereof, etc.

Using digital composition model 400, physical network configurations may be pre-validated using topology emulated 410 before the configurations are implemented in physical network environment 100 and possibly cause undesirable physical network behaviors. Some examples will be discussed below, such as expected layer-2 loops caused by physical link configuration (see FIG. 5), link aggregation issues (see FIG. 6), virtual port channel (VPC) issues (see FIG. 7) and layer-2 domain fragmentation (see FIG. 8). It should be understood that any other physical network behavior may be identified through emulation, such as layer-2 switching issues, layer-3 routing issues, loss of network connectivity, any combination thereof, etc.

Example 1: Physical Link Configuration

Figure 5:
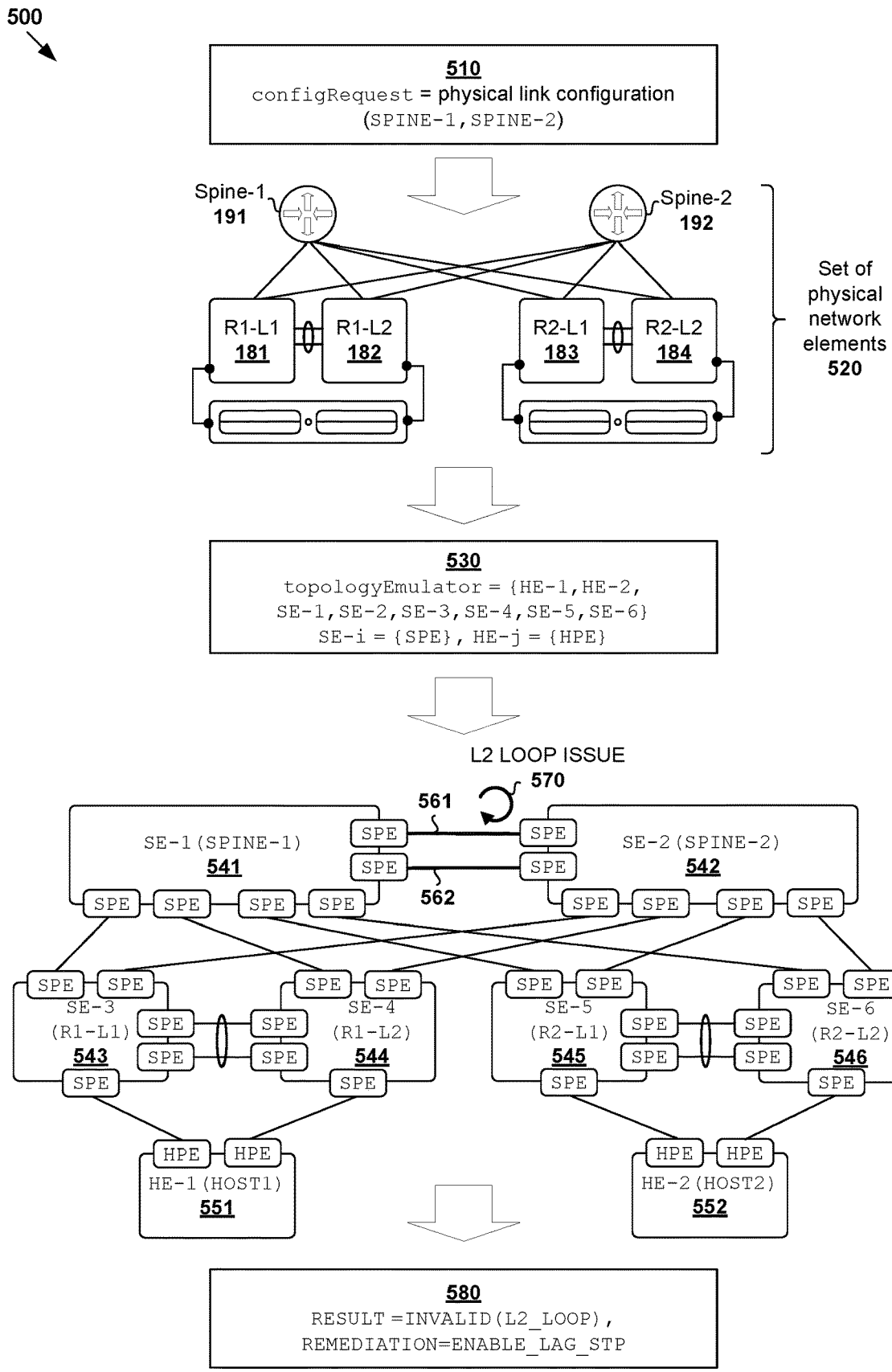
FIG. 5 is a schematic diagram illustrating a first example of pre-validation of network configuration.

FIG. 5 is a schematic diagram illustrating first example 500 of pre-validation of network configuration. Here, consider a network administrator performing day-2 configuration operations such as adding or removing physical hosts 110, physical switches and links (i.e., cables) among them. The network administrator may decide to provide redundancy at the spine level by adding two links between spine switches 191-192. Conventionally, orchestration system 160 may simply activates the links, which may result in a layer-2 loop that will bring down the entire network. In contrast, according to examples of the present disclosure, pre-validation of physical link configuration may be performed.

At 510 and 520 in FIG. 5, in response to detecting a request for physical link configuration between a pair of spine switches 191-192, computer system 170 may identify a set of physical network elements that may be affected by the physical link configuration. For example, set 520 may include spine switches 191-192 to be connected using physical links, as well as ToR switches 181-184 and hosts 110 on respective racks 101-102. Request 510 may be initiated by the network administrator via any suitable user interface supported by orchestration system 160, such as application programming interface (API), command line interface (CLI), graphical user interface (GUI), etc.

At 530 in FIG. 5, computer system 170 may perform pre-validation by through emulation of physical network elements in set 520. Using digital composition model 400 in FIG. 4, topology emulator 410 may be executed to emulate physical network elements in set 520. For example, spine switch emulators 541-542 are configured to emulate corresponding spine switches 191-192 (see "SPE-1" and "SPE-2"). Each spine switch emulator 541/542 aggregates multiple switch port emulators (labelled "SPE") to connect with respective ToR switch emulators 543-546 (see "SPE-3" to "SPE-6").

Each ToR switch emulator 543/544/545/546 may include multiple switch port emulators. For example, a first group of switch port emulators associated with ToR switch emulator 543 (see "SE-3") may be configured to connect with spine switch emulators 541-542 on the uplink, a second group to connect with adjacent ToR switch 544 (see "SE-4") and a third group to connect with host emulator 551 (one shown for simplicity) on the downlink. In practice, ToR switch emulators 543-546 may each aggregate 48 switch port emulators, including 24 downlink 10 Gbps switch port emulators to connect with host emulator 551/552, two interswitch link (ISL) 10 Gbps switch port emulators to connect to an adjacent ToR switch emulator and four 40 Gbps uplink switch port emulators to connect with spine switch emulators 541-542.

Depending on the desired implementation, block 530 may further involve translating request 510 into various emulation requirements. In relation to switch port emulation requirements, computer system 170 may determine whether switch port emulators achieve pre-determined quality of service (QoS) targets and have the necessary configuration (e.g., link aggregation). In relation to switch emulation requirements, computer system 170 may determine whether switch port emulators on a particular ToR switch emulator (e.g., "SE-3" 543) are enabled, including downlink switch port emulators, inter-switch port emulators and uplink switch port emulators. In relation to topology emulation requirements, computer system 170 may determine whether connectivity is maintained between (a) ToR switch port emulators and host port emulators, (b) adjacent ToR switch port emulators and (c) ToR switch port emulators and spine switch emulators.

At 570 in FIG. 5, based on the physical link configuration request, computer system 170 may assess the validity of adding physical links (see 561-562) between spine switch emulators 541-542. In this case, a "what-if" analysis is performed to detect an operational issue in the form of a layer-2 loop. In practice, the layer-2 loop may be identified using a graph representing the forwarding state of all port emulators on all switch emulators. If the forwarding state graph is a tree-like structure, no loop is detected. Otherwise, a loop is detected.

At 580 in FIG. 5, computer system 170 may generate and send a response to orchestration system 160. The response may specify that the physical link configuration in request 510 is assessed to be invalid because of the layer-2 loop issue. Depending on the desired implementation, computer system 170 may identify a remediation action to avoid the layer-2 loop issue, such as configuring physical links 561-562 to form a link aggregation group (LAG) and enabling STP for loop detection. Note that, without pre-validation, orchestration system 160 would not be able to identify the formation of layer-2 loops, which may potentially bring down the entire physical network environment 100.

Example 2: Link Aggregation Configuration

Figure 6:
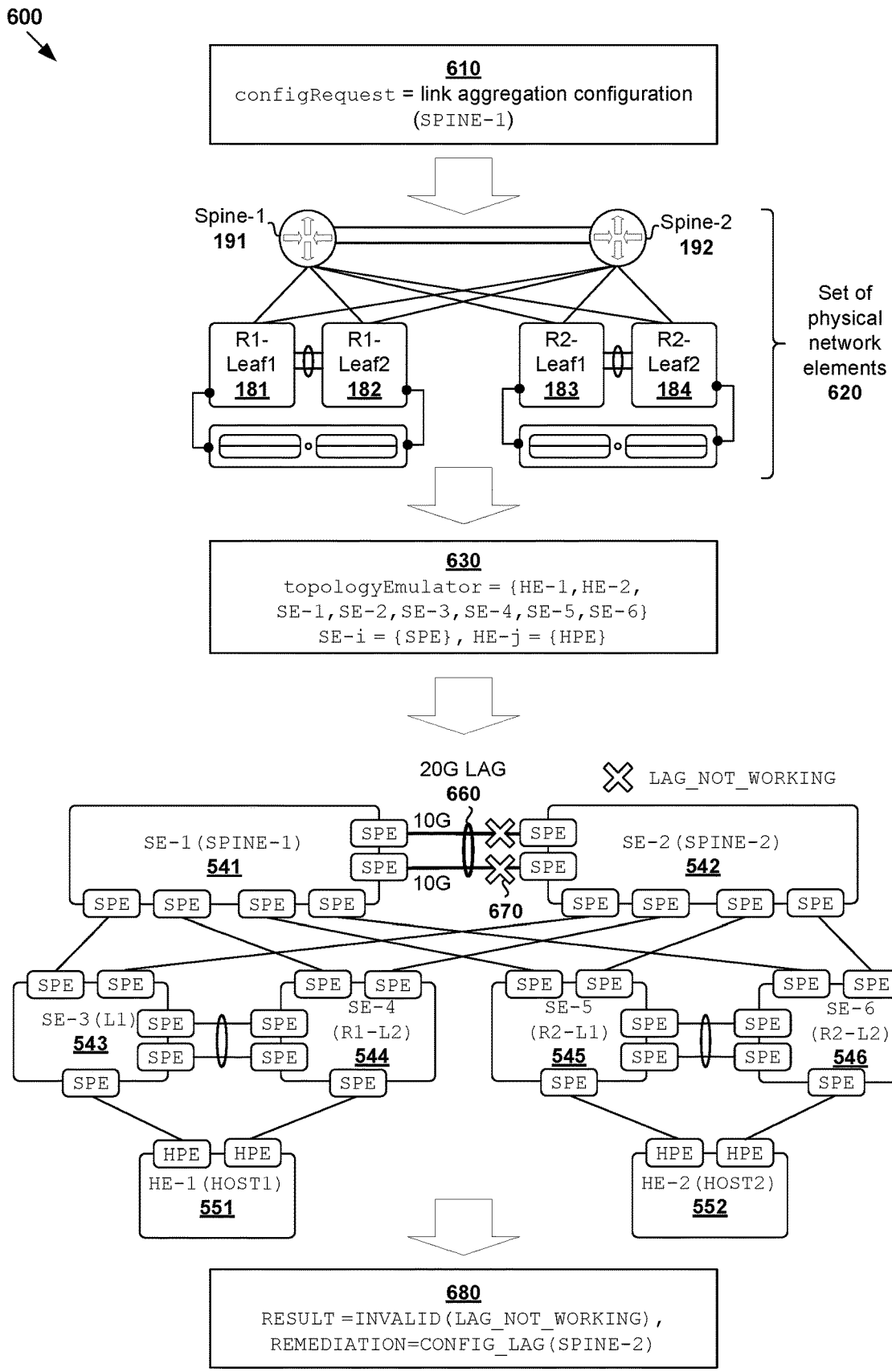
FIG. 6 is a schematic diagram illustrating a second example of pre-validation of network configuration.

FIG. 6 is a schematic diagram illustrating second example 600 of pre-validation of network configuration. In this example, consider the network administrator requesting orchestration system 160 to perform link aggregation configuration on spine switch 191 in physical network environment 100. In practice, the term "link aggregation" may refer generally to approaches for aggregating or combining multiple network links in parallel in order to increase throughput compared to a single link and to provide redundancy in case one of the links fails. Link aggregation may be configured between host 110 and a switch, or between two switches.

At 610 in FIG. 6, a network administrator may request orchestration system 160 to configure link aggregation on one spine switch 191. In particular, request 610 is to combine multiple low-speed switch ports on spine switch 191 into a single higher-speed switch port. In response, orchestration system 160 may cause computer system 170 to perform pre-validation of the link aggregation configuration. At 620-630 in FIG. 6, computer system 170 may identify a set of affected physical network elements and translate the link aggregation configuration request into various emulation requirements.

Using digital composition model 400 in FIG. 4, topology emulator 410 may be executed to include switch emulators 541-546 for emulating respective spine switches 191-192 and ToR switches 181-184, switch port emulators (labelled "SPE") for emulating ports on each switch, host emulators 551-552 for emulating respective hosts 110 (one shown per rack for simplicity) and host port emulators (labelled "HPE") for emulating ports on host 110. Protocol emulator 460 may be executed to emulate LAG protocol on switch port emulators of spine switch 191.

Through emulation of first spine switch 191 using switch emulator 541 (labelled "SE-1") and two inter-switch port emulators (labelled "SPE"), computer system 170 may perform a "what-if" analysis for the link aggregation configuration as if it was implemented. In the example in FIG. 6, request 610 is to configure a 20 Gbps LAG (see 660) on first spine switch 191 only. In this case, computer system 170 may detect the link aggregation configuration is invalid (see 670) because link aggregation is not configured on second spine switch 192. The suggested remediation action is to configure LAG on both spine switches 191-192 (see 680).

Similar link aggregation issues may be identified by computer system 170 when LAG is enabled on a host with two physical NICs connected to two ToR switches. This configuration will cause issues when VPC or multi-chassis LAG is not enabled on the ToR switches. This configuration may be emulated using digital composition model 400 in FIG. 4 in a similar manner to the example in FIG. 6.

Example 3: VPC Configuration

VPC is a variation of LAG where LAGs are created between a host and two switches, or a switch and two other switches to add fault tolerance to physical network environment 100. This way, traffic may be load-balanced across multiple links within a bundle. Similar to the link aggregation example in FIG. 6, VPC configuration should be performed on all three devices involved. Some examples will be described using FIG. 7, which is a schematic diagram illustrating third example 700 of pre-validation of network configuration.

Figure 7:
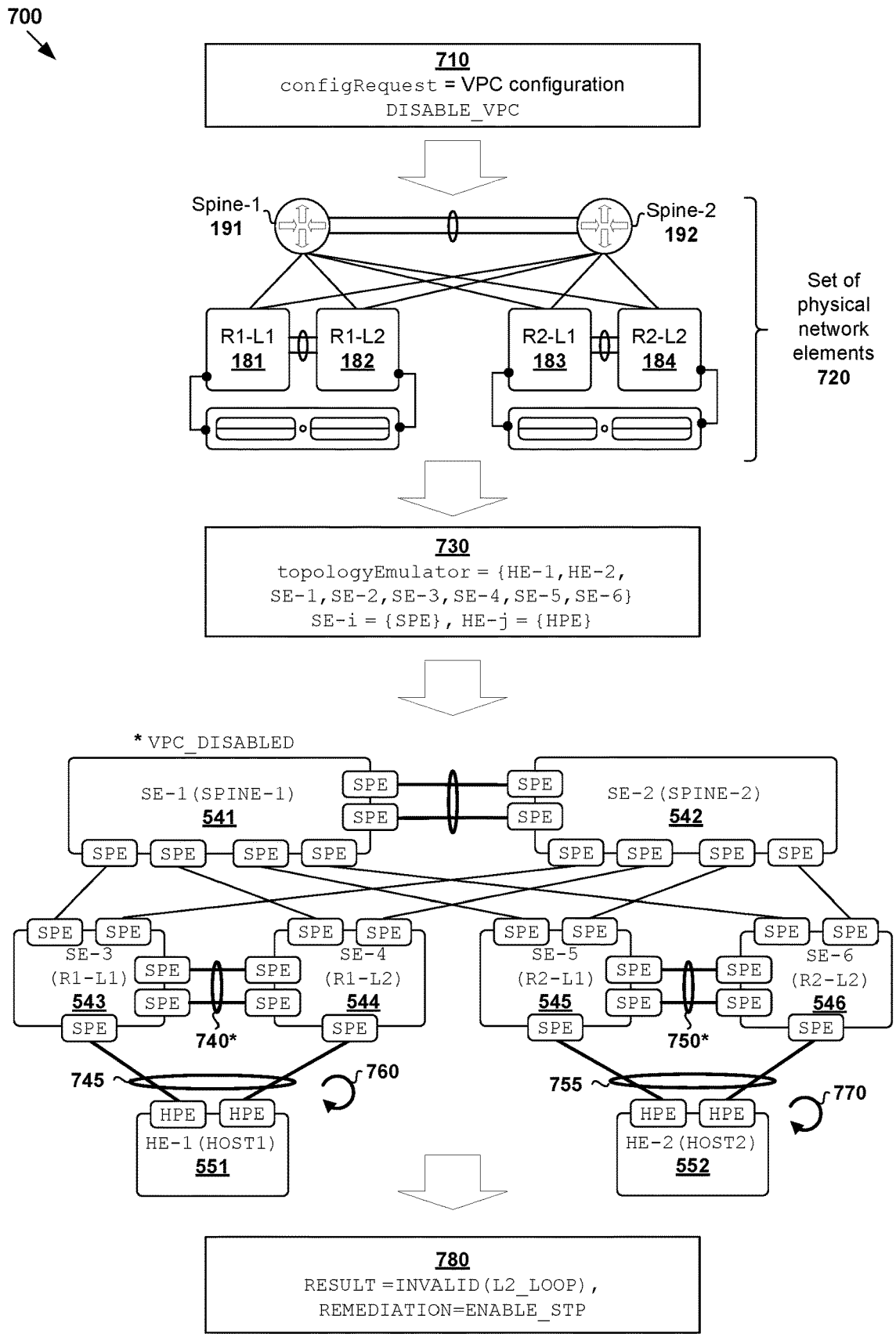
FIG. 7 is a schematic diagram illustrating a third example of pre-validation of network configuration.

At 710 in FIG. 7, consider a network administrator requesting to disable various instances of VPC in physical network environment 100. In response, at 720-730, computer system 170 may identify a set of affected physical network elements and translate request 710 into various emulation requirements. Using digital composition model 400 in FIG. 4, topology emulator 410 may be executed to include switch emulators 541-546, switch port emulators (see "SPE"), host emulators 551-552 and host port emulators (see "HPE"). Protocol emulator 460 may be executed to emulate VPC on the switch port emulators and host port emulators.

In a first example, request 710 is to disable VPC between a first pair of ToR switches 181-182. At 740 in FIG. 7, this may be emulated by disabling VPC between ToR switch emulators 543-544 (see "SE-3" and "SE-4") that are connected with first host emulator 551 (see "HE-1"). In a second example, request 710 is to disable VPC between a second pair of ToR switches 183-184. At 750, this may be emulated by disabling VPC (see 750-765) between ToR switch emulators 545-546 (see "SE-5" and "SE-6") connected with second host emulator 552 (see "HE-2").

Through a "what-if" analysis during pre-validation, computer system 170 may detect the VPC configuration is invalid because removing the VPC configurations may result in layer-2 loops in a transient stage (see 760-770). As indicated at 745 and 755, one reason for the invalidity is because VPC configuration is still enabled on the links between host emulator 551 and the first pair of ToR switch emulators 543-544, as well as between host emulator 552 and second pair of ToR switch emulators 545-546. One remediation action is to enable STP for loop detection before disabling VPC (see 780) on all links involved. The remediation action may be tested by computer system 170 using protocol emulator 460 to emulate the implementation of STP on host port emulators and switch port emulators. In practice, switching loops are undesirable because they result in broadcast radiations and MAC table instability.

Example 4: VLAN Configuration

VLAN is a popular technology used in data centers to configure multiple layer-2 domains. This way, each layer-2 domain may form a broadcast domain that is isolated from other layer-2 domains to improve network scalability. In practice, however, VLAN configuration may be error-prone. Some examples will be discussed using FIG. 8, which is a schematic diagram illustrating fourth example 800 of pre-validation of network configuration.

Figure 8:
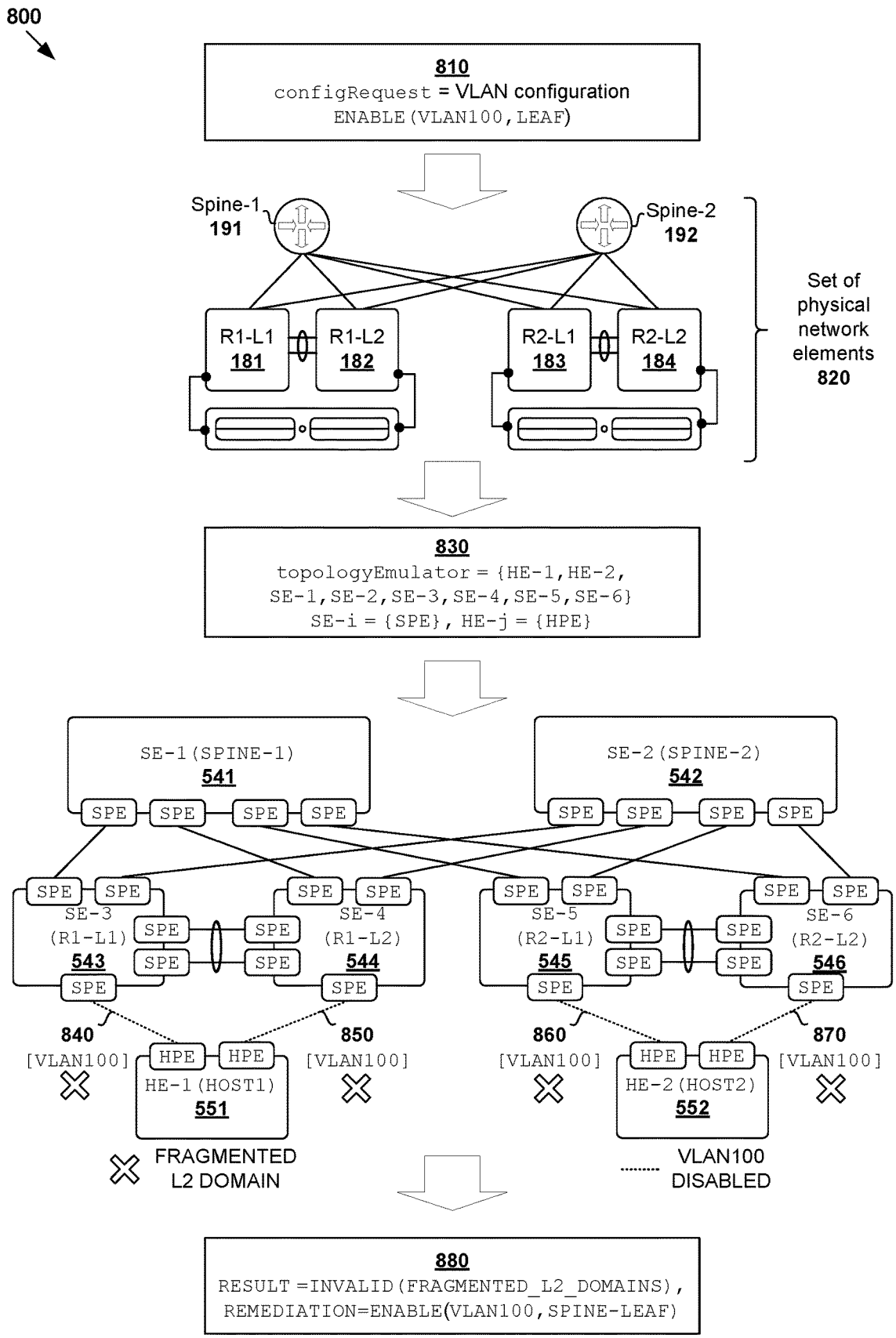
FIG. 8 is a schematic diagram illustrating a fourth example of pre-validation of network configuration.

At 810 in FIG. 8, consider a network administrator requesting orchestration system 160 to configure VLAN on ToR switches 181-184 in physical network environment 100. At 820-830, to pre-validate the VLAN configuration, computer system 170 may identify a set of affected physical network elements and translate request 810 into various emulation requirements. Again, using digital composition model 400 in FIG. 4, topology emulator 410 may be executed to include switch emulators 541-546, switch port emulators (see "SPE"), host emulators 551-552 and host port emulators (see "HPE"). Protocol emulator 460 may be executed to emulate VLAN configuration on ToR switch emulators 543-546.

Through the pre-validation process, computer system 170 may determine the VLAN configuration to be invalid. This is because request 810 only specifies VLAN configuration on ToR switches 181-184, which are emulated by respective switch emulators 543-546. In particular, VLAN 100 is configured on a first link (see 840) and a second link (see 850) connecting host emulator 551 (see "HE-1") with respective ToR switch emulators 543-544 (see "SE-3" and "SE-4"). Since VLAN 100 is not configured on the links connecting spine switch emulator 541 and ToR switch emulators 543-544, two fragmented layer-2 domains will be created instead of a single layer-2 domain spanning corresponding ToR switches emulators 543-544. Similarly, the configuration of VLAN 100 on links (see 860-870) connecting host emulator 552 (see "HE-2") with respective ToR switch emulators 545-546 (see "SE-5" and "SE-6") will result in two fragmented layer-2 domains.

At 880 in FIG. 8, computer system 170 may generate and send a response to orchestration system 160 indicating that the VLAN configuration is invalid because it will result in fragmented layer-2 domains. The response may also specify a remediation action, such as enabling VLAN configuration on links connecting each spine switch 191/192 with respective ToR switches 181-184. This way, orchestration system 160 may alert the network administrator accordingly.

Variations

According to examples of the present disclosure, pre-validation may be implemented for any additional and/or alternative physical network configuration. For example, in relation to QoS configuration, pre-validation may be performed to ensure that QoS targets may be met, such as 20 Gbps peak bandwidth from host 110 within a maximum of three switch hops, etc. In this case, switch port emulator(s) may be configured and the required type of QoS enabled. For example, network input/output control (NIOC) settings may be enabled to guarantee a dedicated amount of network bandwidth to a particular traffic type.

In another example, pre-validation of layer-3 protocol configuration may be performed to ensure that layer-3 links between two switches have matching IP subnet. In a further example, pre-validation of routing configuration may be performed to maintain network connectivity and reduce the likelihood of routing dead-zones. For example, assume that a first router (R1) receives advertisement of network=1.2.3.0/24 from its BGP neighbor=R2. Pre-validation may be performed to ensure that R2 is not inadvertently removed from BGP configuration, which will result in a loss of connectivity with 1.2.3.0/24 and routing dead-zones.

Container Implementation

Although explained using VMs 131-136, it should be understood that physical network environment 100 may include other virtual workloads, such as containers, etc. As used herein, the term "container" (also known as "container instance") is used generally to describe an application that is encapsulated with all its dependencies (e.g., binaries, libraries, etc.). For example, container technologies may be used to run various containers inside respective VMs 131-136. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, the instructions or program code, when executed by the processor of the computer system, may cause the processor to perform pre-validation of network configuration according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform pre-validation of network configuration, the method comprising:
    detecting a request for network configuration to be implemented in a physical network environment;
    identifying a set of physical network elements associated with the network configuration, wherein the set of physical network elements comprises a plurality of hosts arranged on a particular rack, leaf switches that provide connections to the hosts in the particular rack, and spine switches that provide connections between the leaf switches of the particular rack and leaf switches of other racks;
    emulating the set of physical network elements to identify a physical network behavior associated with the network configuration, wherein the set of physical network elements is emulated using (a) multiple first physical network element emulators and (b) second physical network element emulators that each include multiple first physical network element emulators, wherein the second physical network element emulators include leaf switch emulators that emulate the leaf switches and spine switch emulators that emulate the spine switches, and wherein the first physical network element emulators include:
        physical port emulators of the leaf switch emulators to support testing of protocol communication with emulated hosts; and
        physical port emulators of the spine switch emulators to support testing of protocol communication between the emulated leaf switches;
    based on the physical network behavior identified from the emulating, assessing validity of the network configuration to determine whether to implement the network configuration; and
    in response to assessment that the network configuration is invalid, specifying a remediation action to avoid or ameliorate the physical network behavior, wherein the remediation action includes some other network configuration to be implemented in the physical network environment.

2. The method of claim 1, wherein emulating the set of physical network elements further comprises:
    emulating multiple physical host ports in the physical network environment using respective multiple physical host port emulators, included amongst the multiple first physical network element emulators; and
    emulating the particular host in the physical network environment using a physical host emulator, included amongst the second physical network element emulators, that aggregates the multiple physical host port emulators.

3. The method of claim 1, wherein emulating the set of physical network elements further comprises:
    emulating, using a protocol emulator, protocol implementation on at least one of (a) a particular first physical network element emulator and (b) a particular second physical network element emulator.

4. The method of claim 1, wherein assessing validity of the network configuration comprises:
    assessing the network configuration to be invalid based on one or more physical network behaviors, caused by the network configuration, that include: layer-2 loop, loss of connectivity, link aggregation issue, virtual port channel (VPC) issue, fragmented layer-2 domains, switching issue, and routing issue.

5. The method of claim 1, further comprising:
    in response to the assessment that the network configuration is invalid and after specifying the remediation action to avoid or ameliorate the physical network behavior, testing the other network configuration.

6. The method of claim 1, further comprising:
    generating and sending a response to an orchestration system from which the request is detected, wherein the response specifies whether the network configuration is (a) valid to cause the orchestration system to implement the network configuration or (b) invalid to cause the orchestration system to disregard the request for network configuration.

7. A non-transitory computer-readable storage medium that includes a set of instructions which, in response to execution by a processor of a computer system, cause the processor to perform a method of pre-validation of network configuration, wherein the method comprises:
    detecting a request for network configuration to be implemented in a physical network environment;
    identifying a set of physical network elements associated with the network configuration, wherein the set of physical network elements comprises a plurality of hosts arranged on a particular rack, leaf switches that provide connections to the hosts in the particular rack, and spine switches that provide connections between the leaf switches of the particular rack and leaf switches of other racks;

emulating the set of physical network elements to identify a physical network behavior associated with the network configuration, wherein the set of physical network elements is emulated using (a) multiple first physical network element emulators and (b) second physical network element emulators that each include multiple first physical network element emulators, wherein the second physical network element emulators include leaf switch emulators that emulate the leaf switches and spine switch emulators that emulate the spine switches, and wherein the first physical network element emulators include:

physical port emulators of the leaf switch emulators to support testing of protocol communication with emulated hosts; and physical port emulators of the spine switch emulators to support testing of protocol communication between the emulated leaf switches;

based on the physical network behavior identified from the emulating, assessing validity of the network configuration to determine whether to implement the network configuration; and in response to assessment that the network configuration is invalid, specifying a remediation action to avoid or ameliorate the physical network behavior, wherein the remediation action includes some other network configuration to be implemented in the physical network environment.

8. The non-transitory computer-readable storage medium of claim 7, wherein emulating the set of physical network elements further comprises:

emulating multiple physical host ports in the physical network environment using respective multiple physical host port emulators, included amongst the multiple first physical network element emulators; and emulating the particular host in the physical network environment using a physical host emulator, included amongst the second physical network element emulators, that aggregates the multiple physical host port emulators.

9. The non-transitory computer-readable storage medium of claim 7, wherein emulating the set of physical network elements further comprises:

emulating, using a protocol emulator, protocol implementation on at least one of (a) a particular first physical network element emulator and (b) a particular second physical network element emulator.

10. The non-transitory computer-readable storage medium of claim 7, wherein assessing validity of the network configuration comprises:

assessing the network configuration to be invalid based on one or more physical network behaviors, caused by the network configuration, that include: laye-2 loop, loss of connectivity, link aggregation issue, virtual port channel (VPC) issue, fragmented layer-2 domains, switching issue, and routing issue.

11. The non-transitory computer-readable storage medium of claim 7, wherein the method further comprises:

in response to the assessment that the network configuration is invalid and after specifying the remediation action to avoid or ameliorate the physical network behavior, testing the other network configuration.

12. The non-transitory computer-readable storage medium of claim 7, wherein the method further comprises:

generating and sending a response to an orchestration system from which the request is detected, wherein the response specifies whether the network configuration is (a) valid to cause the orchestration system to implement the network configuration or (b) invalid to cause the orchestration system to disregard the request for network configuration.

13. A computer system, comprising:

a processor; and a non-transitory computer-readable medium having stored thereon instructions that, when executed by the processor, cause the processor to:

detect a request for network configuration to be implemented in a physical network environment;

identify a set of physical network elements associated with the network configuration, wherein the set of physical network elements comprises a plurality of hosts arranged on a particular rack, leaf switches that provide connections to the hosts in the particular rack, and spine switches that provide connections between the leaf switches of the particular rack and leaf switches of other racks;

emulate the set of physical network elements to identify a physical network behavior associated with the network configuration, wherein the set of physical network elements is emulated using (a) multiple first physical network element emulators and (b) second physical network element emulators that each include multiple first physical network element emulators, wherein the second physical network element emulators include leaf switch emulators that emulate the leaf switches and spine switch emulators that emulate the spine switches, and wherein the first physical network element emulators include:

physical port emulators of the leaf switch emulators to support testing of protocol communication with emulated hosts; and physical port emulators of the spine switch emulators to support testing of protocol communication between the emulated leaf switches;

based on the physical network behavior identified from the emulation, assess validity of the network configuration to determine whether to implement the network configuration; and in response to assessment that the network configuration is invalid, specify a remediation action to avoid or ameliorate the physical network behavior, wherein the remediation action includes some other network configuration to be implemented in the physical network environment.

14. The computer system of claim 13, wherein the instructions that cause the processor to emulate the set of physical network elements further cause the processor to:

emulate multiple physical host ports in the physical network environment using respective multiple physical host port emulators, included amongst the multiple first physical network element emulators; and emulate the particular host in the physical network environment using a physical host emulator, included amongst the second physical network element emulators, that aggregates the multiple physical host port emulators.

15. The computer system of claim 13, wherein the instructions that cause the processor to emulate the set of physical network elements further cause the processor to:

emulate, using a protocol emulator, protocol implementation on at least one of (a) a particular first physical network element emulator and (b) a particular second physical network element emulator.

16. The computer system of claim 13, wherein the instructions that cause the processor to assess validity of the network configuration cause the processor to:
   assess the network configuration to be invalid based on one or more physical network behaviors, caused by the network configuration, that include: layer-2 loop, loss of connectivity, link aggregation issue, virtual port channel (VPC) issue, fragmented layer-2 domains, switching issue, and routing issue.

17. The computer system of claim 13, wherein the instructions further cause the processor to:
   in response to the assessment that the network configuration is invalid and after specification of the remediation action to avoid or ameliorate the physical network behavior, test the other network configuration.

18. The computer system of claim 13, wherein the instructions further cause the processor to:
   generate and send a response to an orchestration system from which the request is detected, wherein the response specifies whether the network configuration is (a) valid to cause the orchestration system to implement the network configuration or (b) invalid to cause the orchestration system to disregard the request for network configuration.

* * * * *